United States Patent [19]

Escalante Ramirez et al.

[11] Patent Number: 5,452,376
[45] Date of Patent: Sep. 19, 1995

[54] METHOD AND DEVICE FOR SINGLE AND/OR MULTI-SCALE NOISE REDUCTION SYSTEM FOR PICTURES

[75] Inventors: Boris Escalante Ramirez; Jean B. O. S. Martens, both of Eindhoven, Netherlands

[73] Assignee: U.S. Philips Corporation, New York, N.Y.

[21] Appl. No.: 238,189

[22] Filed: May 4, 1994

Related U.S. Application Data

[63] Continuation of Ser. No. 874,660, Apr. 27, 1992, abandoned.

[30] Foreign Application Priority Data

May 16, 1991 [EP] European Pat. Off. ............ 91107900

[51] Int. Cl.$^6$ .............................................. G06K 9/36
[52] U.S. Cl. ..................................... 382/274; 382/280
[58] Field of Search ................ 382/56, 54, 42, 43; 348/384, 408, 607, 608, 613, 618

[56] References Cited

U.S. PATENT DOCUMENTS

| | | | |
|---|---|---|---|
| 4,118,104 | 1/1988 | Anderson | 382/43 |
| 4,442,454 | 4/1984 | Powell | 348/618 |
| 4,941,042 | 7/1990 | Martens | 358/133 |
| 4,953,018 | 8/1990 | Martens | 358/133 |

*Primary Examiner*—Leo H. Boudreau
*Assistant Examiner*—Phuoc Tran
*Attorney, Agent, or Firm*—Leroy Eason

[57] ABSTRACT

For noise reduction in a two-dimensional image it is sampled according to a regular array of window sampling positions. The image function is then subjected to multiplication by a window function and conversion to a weighted sum of polynomials according to ascending order. If the next-m-lowest order coefficient signals a sufficient intensity variation in the window, all coefficients are used for subsequent inverse polynomial transform. Otherwise, predominantly only the lowest order coefficient is used therefore. In a cascaded organization, the lowest order coefficient is viewed as itself representing the image information and likewise processed in a forward-inverse polynomial transform organization with respect to an upscaled-size window. The result is then used in a next lower cascade level in lieu of the unprocessed lowest order coefficient itself.

8 Claims, 2 Drawing Sheets

METHOD AND DEVICE FOR SINGLE AND/OR MULTI-SCALE NOISE REDUCTION SYSTEM FOR PICTURES

This is a continuation of application Ser. No. 07/874,660, filed Apr. 27, 1992, abandoned.

FIELD OF THE INVENTION

The present invention relates to noise reduction in pictures. Presence of noise in a picture will detract from its subjective quality, endanger its processing such as segmentation and may even mask low-contrast features therein. Earlier methods make a compromise between smoothing noisy regions and preserving the sharpness of relevant image features. This situation should be improved, while keeping reconstruction filtering relatively simple.

SUMMARY OF THE INVENTION

An underlying idea to the invention is that an effective noise-reduction method should be able to locally adapt itself to the image. The proposed approach to noise-reduction relates to properties of an early stage of the human visual system; this stage extracts relevant information, such as, in particular, location, orientation, and contrast of luminanee transitions. In order to analyze an image on a local basis, the image is first sampled with a uniform window according to a regular array of window sampling positions. Each image element is attributed to at least one such window position by multiplication thereof with a window function, and for each window position further processing is carried out. The window positions constitute a sampling array. As for the window function, it may be a Gaussian function for the continuous case, and a binomial function for the discrete case, although other functions would apply as well. Within each window, the image is further described by a weighted sum of polynomials of ascending order and which are orthogonal to and determined by the window function. For a Gaussian window function, these are the Hermite polynomials. For a binomial window function, these are the Krawtchouk polynomials. Each image element must be attributed to at least one window position; otherwise, its information would be lost and could not be recovered. For the same reason, the window function may not have all zeroes inside the window and at least not at those positions where an image element (such as a pixel) is located. With, even more relaxed requirements, each image element should be attributed to at least one window position that has a non-zero value of the window function at that particular image position. The mapping from the input image to the weights of the polynomials, henceforth referred to as the polynomial coefficients, is called a forward polynomial transform. By interpolating the polynomial coefficients with specific further functions, the original image can be resynthesized. This process is called the inverse polynomial transform.

Now, as will be explained in detail hereinafter, the relative contributions of noise and of actual features of the image to the respective polynomial coefficients differ. In consequence, it is an object of the present invention to execute a particular comparison operation on the polynomial coefficients to detect if any significant details exist in the window in question, and if absent, to leave out substantially all polynomials of the reconstructible image which have a high spatial frequency, thereby obtaining a reconstructed image that is substantially free of various categories of noise. This object is realized in that the invention it provides the following steps:

a. sampling the image with a uniform window according to a regular array of window sampling positions, each image element being attributed to at least one such position by multiplying said element with a window function and for each window position executing the following steps:

b. representing said multiplied elements by a weighted sum of polynomials which are orthogonal to the window function, and which are as a finite set of ascending order;

c. generating for each window an intensity variation quantity based on at least an element of said set of polynomial coefficients of next-to-lowest order;

d. comparing said intensity variation quantity with a preset threshold level so as to generate either a low or a high outcome signal;

e. under control of a low outcome signal transmitting predominantly the lowest order element of said set; and under control of a high outcome signal transmitting substantially equivalently each order element of said set; and f. receiving each transmitted element of said set and subsequently forming therefrom a two-dimensional reconstruction of the part of the image attributed to the window in question.

It has been found that such processing achieves substantial improvement without loss of significant detail of the image. Both the introduction of the window function and the representation of image elements by polynomials boil down to a multiplication operation; in consequence, the execution of these two steps need not be separate in time but may be combined. Furthermore, in combination with the processing according to the teachings of the present invention, various other filterings operations may be effected as well and, for hardware saving, executed in the same device. Therefore, the term filtering equivalently refers to reconstruction of the image according to the present invention.

According to an even more particular embodiment of the present invention, between steps e and f, the lowest order element of said set is subjected to execution of:

g. repitition of steps a to c to perform an "upscaled"-window attribution operation including comb filtering and secondary reconstruction, and presentation of the result to the next to method step f in lieu of direct presentation from step e. Scrupulous choice of the various window sizes, the threshold level and the selective gating, achieves a startling improvement of the image at a remarkably low calculating effort, that is effectively lower than that required in the one-step procedure. The process be pyramided, having two, three, or more levels. The invention also relates to a device for implementing the method.

As state of the art, reference is had to U.S. Pat. No. 4,941,042 issued Jul. 10, 1990 to one of the present applicants (PHN 12.558), which is incorporated herein by reference. It relates to a television transmission system using transmission of basic picture weighting factors, and on a mathematical level has certain correspondence to the present application. However, the reference patent relates to minimizing channel requirements in a broadcast system, whereas the present invention relates to noise reduction. Noise reduction is not present in the reference patent.

BRIEF DESCRIPTION OF THE FIGURES

The invention will be described hereinafter first, with respect to some supporting theory, and next, in particular detail with respect to a preferred embodiment shown in the appended Figures wherein.

DETAILED DESCRIPTION OF THE PREFERRED EMBODIMENTS OF THE INVENTION

Figure 1A:
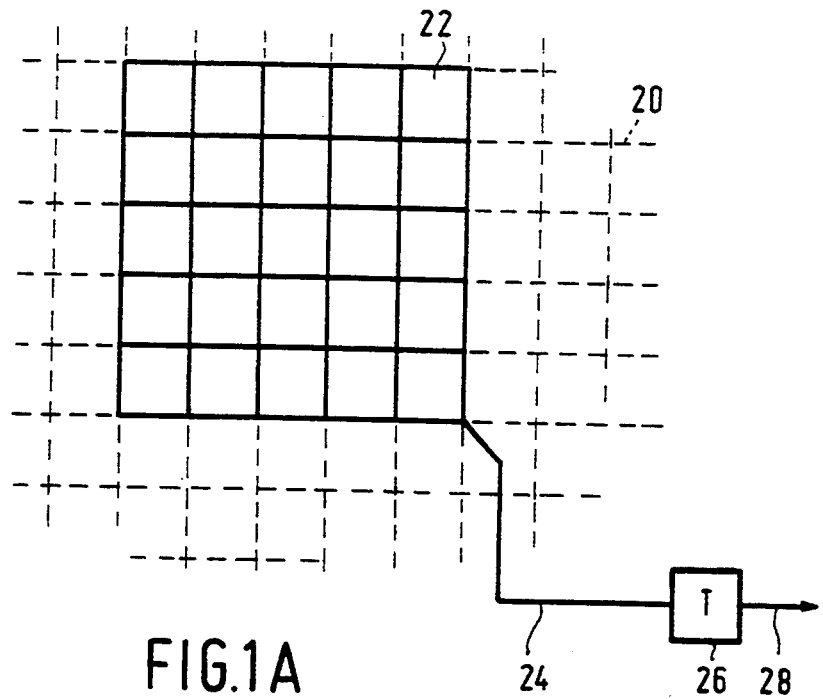
FIGS. 1A and 1B conceptually show a two-dimensional filter bank.

A polynomial transform which for explanatory expediency, is considered in one dimension X, is constructed as follows:

Choose a spatial window function $V(x)$ and an image sample spacing T;

Assume a weighting function which satisfies $$W(x) = \sum_k V(x - kT) \neq 0$$

for all positions x;

polynomials $G_n(x)$, of degree n, that are orthogonal over $V^2(x)$; for a window of 5 pixels, the maximum degree n is equal to 4;

Perform a forward polynomial transform to obtain polynomial coefficients $L_n(kT)$ by convolving the input image signal with the filter function $$D_n(x) = G_n(-x) V^2(-x);$$

followed by sampling at multiples of T;

Perform the inverse polynomial transform, reconstructing the image by interpolating the polynomial coefficients $L_n(kT)$ for each k integer, with the pattern function $$P_n(x) = G_n(x) V(x)/W(x),$$

and summing over all orders n.

Similarly, in two dimensions x,y the polynomial coefficients $L_{m,n-m}(p,q)$ of the polynomials $G_{m,n-m}(x-p,y-q)$, for all positions $(p,q) \epsilon S$ of the window function $V(x-p,y-q)$, are derived by convolving the input image signal $L(x,y)$ with a filter function $$D_{m,n-m}(x,y) = G_{m,n-m}(-x,-y)V^2(-x,-y) \quad (1)$$

and selecting the outputs at the positions (p,q) in the sampling lattice S, for $m=0, \ldots, n$ and $n=0,1, \ldots, N$. The coefficient $$L_{m,n-m}(p,q) = \int_{-\infty}^{+\infty} \int_{-\infty}^{+\infty} L(x,y) D_{m,n-m}(p - x, q - y) dx dy \quad (2)$$

of the polynomial $G_{m,degree(n-m)}$ has degree m in x and n-m in y. The polynomials are orthogonal with respect to the window function, i.e., $$\int_{-\infty}^{+\infty} \int_{-\infty}^{+\infty} V^2(x,y) G_{m,n-m}(x,y) G_{l,k-l}(x,y) dx dy = \delta_{nk}\delta_{ml}, \quad (3)$$

for $n,k=0, \ldots, N$, $m=0, \ldots, n$ and $l=0, \ldots, k$, where $\delta_{nk}$ denotes the Kronecker function. The maximum order of the polynomial expansion is denoted by N.

The resynthesized image L(x,y) is obtained by the interpolation process of the inverse transform, i.e., $$L(x,y) = \sum_{n=0}^{N} \sum_{m=0}^{n} \sum_{(p,q)\epsilon S} L_{m,n-m}(p,q) P_{m,n-m}(x - p, y - q). \quad (4)$$

The interpolation functions are defined by $$P_{m,n-m}(x,y) = G_{m,n-m}(x,y)V(x,y)/W(x,y), \quad (5)$$

for $m=0, \ldots, n$ and $n=0,1, \ldots, N$, where $$W(x,y) = \sum_{(p,q)\epsilon S} V(x - p, y - q). \quad (6)$$

is called the weighting function. The only condition for the existence of the polynomial transform is that this weighting function be different from zero for all coordinates (x,y). Preferably, the window function is separable in two dimensions, according to $V(x,y) = V(x) \cdot V(y)$.

For the window functions, a Gaussian is preferred for a continuous signal approach and, a binomial function for a discrete signal implementation. Also, the size of the window is a critical parameter. For a large window, the calculations are relatively complex. An elementary binomial window function is the following:

$$V(x) = [1 \ \sqrt{2} \ 1] \cdot \tfrac{1}{2}$$

$$V^2(x) = [1 \ 2 \ 1] \cdot \tfrac{1}{4}$$

defined for positions (−1,0,+1). Herein, $V^2(x)$ is a binomial distribution. In that case, the three normalized Krawtchouk polynomials are:
$G_0(x)=1$
$G_1(x)=x \cdot \sqrt{2}$
$G_2(x)=2 \times^2 -1$,
whereas $$\sum_{x=-1}^{1} V^2(x) G_i(x) G_j(x) = \delta_{ij}.$$

From a performance point of view, using a large window in the noise reduction algorithm has advantages and disadvantages. Quite often, edges will be accompanied by a band of noise. On the other hand, the advantage is that low-contrast transitions will be preserved. For a small window the advantages and disadvantages are generally complementary. For typical computer tomography images, with fairly uncorrelated noise, a binomial window function of order $N=4(5\times 5$ pixels) was found to give optimum results. Another parameter is the spacing between successive window positionings in the lattice. Further, although hexagonal sampling conforms best to human vision characteristics, it is more difficult to implement than rectangularly spaced positioning of the sampling positions. Therefore, the latter is usually preferred in applications.

Hereinafter, we use the energy contained in the polynomial coefficients to detect existence of meaningful signal patterns in the image. The single order local-energy measure of order n is:

$$E_n = \sum_{m=0}^{n} L^2_{m,n-m} \quad (7)$$

for n=1, ... ,N. The overall local energy measure is:

$$E = \sum_{n=1}^{N} E_n \quad (8)$$

The prime interest now is the noise-caused contribution to $E_1$. Noise is particularly detrimental in low-contrast regions of the image. It can be derived that if the noise obeys certain symmetry prerequisites, $E_1$ has the following probability distribution function $$P(E_1)=(\tfrac{1}{2}\sigma^2) \quad (9)$$

$E_1$ is used to detect edges in the image. In the embodiment hereinafter, a fixed threshold of $E_1$ is taken as a multiple of $\sigma$, where $\sigma$ is the noise spread. This is a logical choice, since the probability distribution shows that the decision problem scales with $\sigma^2$. If other variances apply, they would occur in the expression in roughly comparable manner. An estimate of the noise spread $\sigma$ can be measured in uniform regions of the image (or a first image of a sequence of comparable images). In experiments, with a binomial window function of order 4, an optimum value for the threshold parameter was D=3.5. The threshold of $E_1$ is versus $D^2\sigma^2$.

FIG. 1A conceptually shows a two-dimensional filter bank. The image is considered to consist of a rectangular grid of discrete pixel areas separated by interrupted lines. In a simple set-up, each pixel has an attributed grey value, although in principle the invention could be useful for coloured pixels. The window size has been depicted as a grid 22 of 5×5 pixels. The various different polynomial coefficients describe the information within the window, and are produced by calculating associated different weighted sums of the pixels within the window. These weights are described mathematically by expression (1) above. The polynomial coefficients are output on a channel 24 that may be a bundle of parallel lines, or be functionally multiplexed. A sampling lattice determines where successive windows 22 will be positioned in the image. Element 26 represents a transient storage for the polynominal coefficients before outputting them on line 28. The next window position may be shifted a period of 5 pixels in either the x or y direction. However, overlap is in principle possible.

Figure 1B:
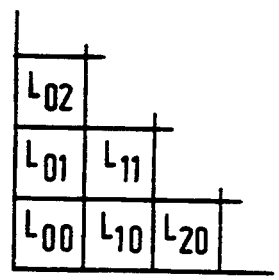

FIG. 1B shows the associated polynomial coefficients, $L_{ij}$. The lowest order, $L_{00}$ indicates average value. The next two, $L_{01}$ and $L_{10}$, indicate spatial variation. One may write the coefficients as a vector series, $L_N$, with components $L_{0,N}, L_{1,N-1}, \ldots L_{N,0}$. For the zero order only one component is present. For the first order, there are two, that represent variations with equal resolution but different orientation in the x and y directions. Oblique variations contribute to both $L_{01}$ and $L_{10}$. In the embodiment shown, only those two are indicated.

Figure 2:
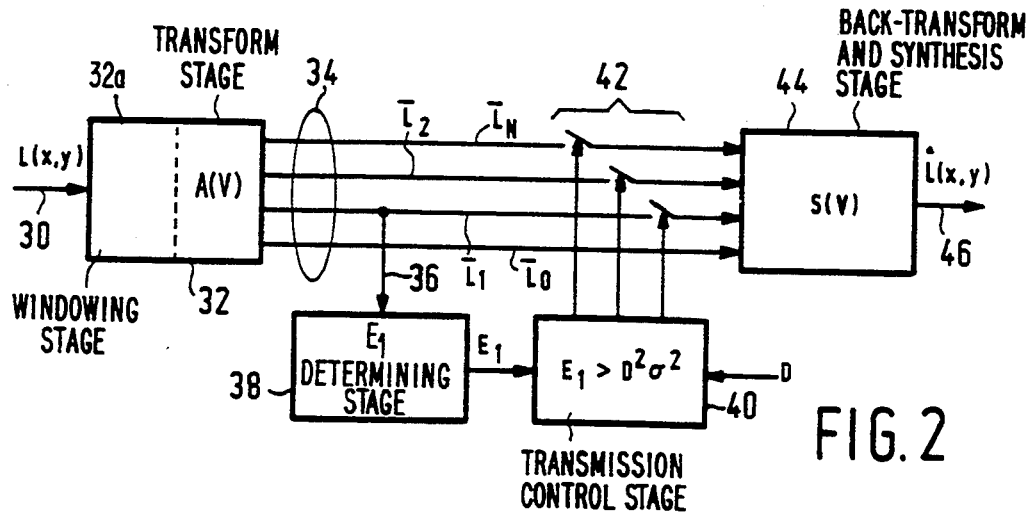
FIG. 2 shows a single-scale noise reduction system in accordance with the invention.

FIG. 2 shows a single-level noise reduction system. Input 30 receives the image information. Block 32 applies the window filtering and block 32b performs the polynomial transformation which generates the polynomial coefficients such coefficients being grouped as respective vectors $\overline{L}_j$ on the respective lines in bundle 34, the number of vector components on any line j being equal to (j+1), for j=0, 1, ... N. The lines in bundle 34 include switches 42 for each vector except vector $\overline{L}_0$. Block 44 executes the two-dimensional image synthesis, which closely resembles the the synthesis described in the cited patent. In block 38 a branch 36 from the line carrying $\overline{L}_1$ is received and the energy component $E_1$ is calculated for forwarding to block 40. In block 40 a comparison is made between $E_1$ and $D^2\sigma^2$. Herein, $\sigma$ is a parameter than can be measured. It may be a parameter of the apparatus itself, such as the CT-machine. The parameter D is selected for optimum performance. It is externally input, either by way of feedback, or by way of trial and error, or otherwise. If $E_1$ exceeds the threshold $\sigma^2D^2$, switches 42 are rendered transmissive. If $E_1$ is lower than the threshold, switches 42 will block incoming signals for the window in question. Electronically, some delay may be present after branch 36, but before switches 42, to guarantee synchronous operation.

Some parameters can be selected; such as the value of N, $\sigma^2$, $SD^2$. Also, the transmissive properties may be influenced. For example, block 40 may be an operational amplifier, the difference signal. Produced thereby serving an attenuator control in bundle 34. Such attenuation may differ for each line in bundle 34. It is fundamental, however, that in case of low $E_1$, block 44 is predominantly fed by $\overline{L}_0$, which predominance is reduced for higher value of $E_1$. Of course even if $E_1$ does not exceed the threshold, some fraction of $\overline{L}_1 \ldots$ could be transmitted. It would even be feasible to have a succession of threshold levels, each surpassing of a threshold by $E_1$ making the dominance of $\overline{L}_0$ less, in that the transmission for $\overline{L}_1 \ldots \overline{L}_N$ be increased in certain steps, according to necessity. Also, these higher orders could be taken into account to some degree in the comparison in block 40, but the additional complexity does not yield appropriately better performance. It should be noted that the cited reference does not show the comparing by elements 40, 38, and the selective transmitting/blocking by gates 42.

Figure 3:
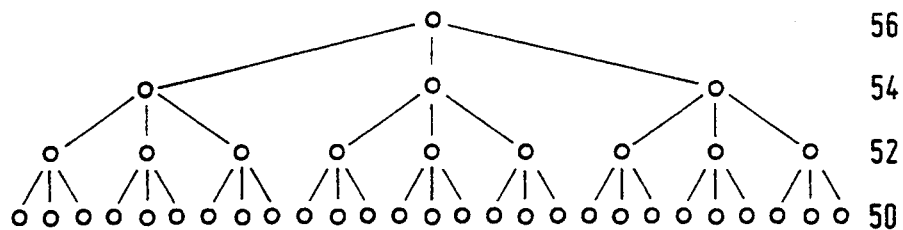
FIG. 3 is a conceptual pyramiding of the system in FIG. 1.

FIG. 3 conceptually shows a pyramided embodiment of the invention. For simplicity, again a one-dimensional organization has been adopted. On the lowest level 50, each little circle corresponds to one pixel. Three contiguous pixels are combined into a single window at the next higher level 52. As will be explained hereinafter, the signal representing this window is equal to the weighted average value of the pixels on lowest level 50. On level 54, the process is again repeated: three contiguous pseudo-pixels are combined into a window at level 54. The average signal produced at that level is then again combined in a higher level window 56. In this example the window step size is equal to the window size, to wit, three pixels, at every level. The scheme can be changed in many ways, such as:

have two contiguous windows share one pixel: window size 3, window step 2
other relations between window size and window step, although the window step may never be larger than the window size itself
other window sizes organization may be different on respective other levels of the pyramid.

In a two-dimensional organization, other degrees of freedom appear. Windows may be square (in terms of the number of pixels), or rectangular, and the general set-up for the two directions may differ. A rationale might be that the image itself be organized differently in two directions due to a particular image source.

Figure 4:
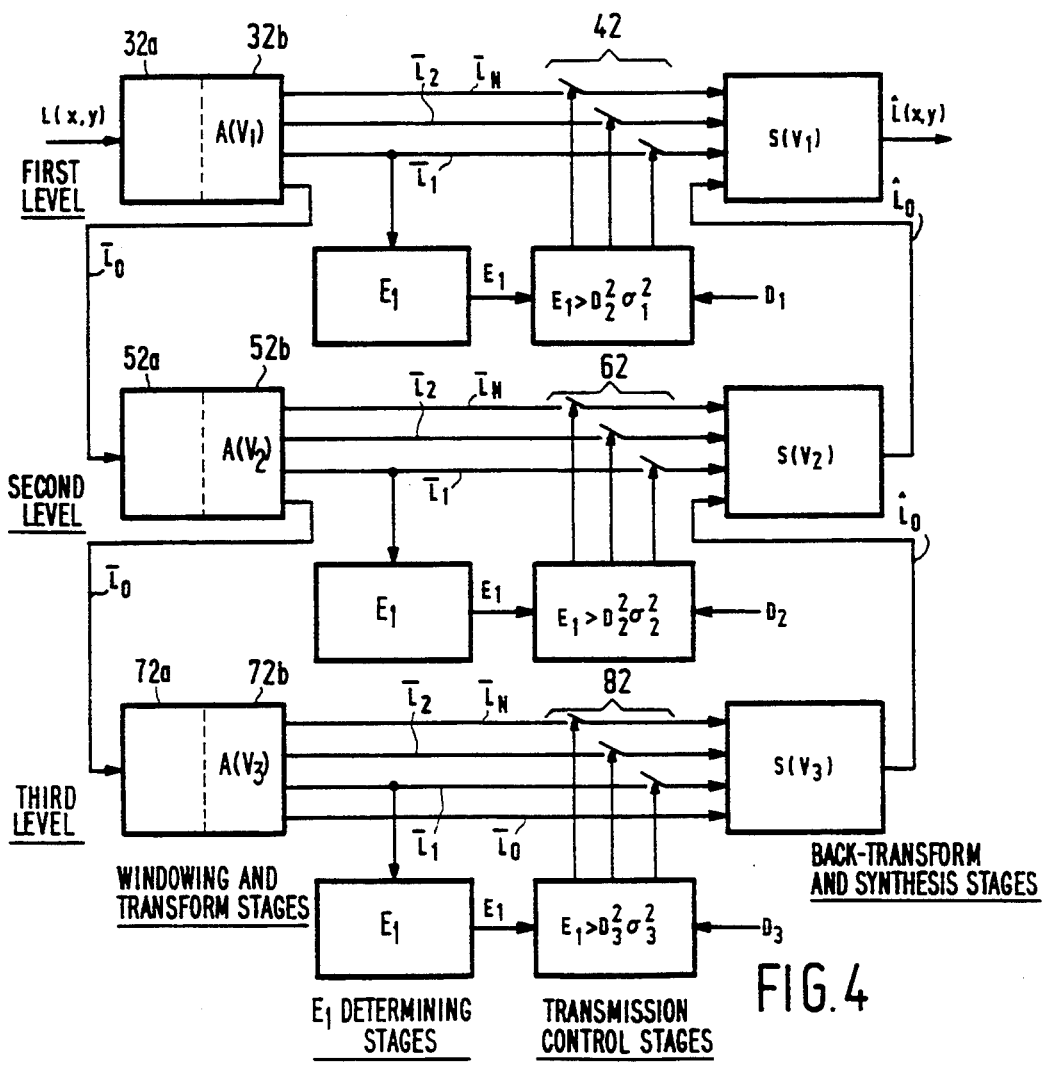
FIG. 4 a is a pyramided plural-scale noise reduction system.

FIG. 4 shows a plural scale noise reduction system using the pyramid concept of FIG. 3, each next higher level an "upscaled" window with respect to its predecessor. There are three levels, the input to each level after the first being a hierarchy of windows (two dimensional) as explained with respect to FIG. 3. For example, block 32 would employ a 3×3 pixel window. Block 52, which receives vector $\overline{L}_0$ from block 32, employs a 9×9 pixel window (as related to the original image); block 72 in the same way employs a 27×27 pixel window. If there is each time a one-pixel overlap, the windows would then be 3×3, 7×7, and 19×19 pixels, respectively. Each layer again makes a determination of $E_1$ from its first order vector $\overline{L}_1$, and compares $E_1$ with a local threshold $D^2_i \sigma^2_i$, where i=1,2,3. Each threshold may be unique. In particular, all values $D_i$ may be equal. In combination with standard noise properties, such that $\sigma^2_3 < \sigma^2_2 < \sigma^2_1$, this would lead to various operational situations in the three layers. Furthermore, the lowest order output of the two-dimensional reconstruction is again provided in lieu of $\overline{L}_0$ to the reconstruction performed at the next lower level. The construction has not been shown in full details. Synchronization between the various subsystems has not been shown, but could be on a pixel-by-pixel or window-by-window basis. Such synchronization is straightforward. The embodiment in FIG. 4 has various advantages with respect to FIG. 2; namely:

a) the number of operations is much less: for a window as in FIG. 2 the number of operations increases much faster than proportional to the number of pixels per window. In fact, a 19×19 pixel window is well-nigh unmanageable.

b) the number of levels in FIG. 4 may be adapted to the degree of correlation of the noise. In the case of completely uncorrelated noise, having no image, all switches will be open. In case there are image features, the higher-level switches will already be closed for weak feature energy because the higher level values $\sigma^2_i$ are smaller. In fact, in case of low noise correlation, only one level would do. Further, rendering the gates transmissive causes a noise band near the feature. A weak feature however, is associated with a band of only weak noise because the lower level switches (42) may stay open and the higher level switches (82 and possibly also 62) may be rendered transmissive. If the noise is correlated, more levels are necessary because the lower level switches may stay open.

We claim:

1. A method of reducing noise in a two-dimensional video image formed by pixels of various intensities, said method comprising:

(a) sampling the image with a uniform sampling window successively placed at each of a uniform array of sampling window positions, each pixel being included in one or more of the sampling window positions, the sampling deriving from each pixel a pixel value in each of the sampling window positions in which said pixel is included; and for each sampling window position performing the steps of:

(b) multiplying the pixel values therein by a sampling window function so as to derive a set of multiplied pixel values;

(c) performing a forward transform of the set of multiplied pixel values so as to derive a finite set of weighted polynomials which are orthogonal to said sampling window function and include a zeroth order polynomial and polynomials of a first and further ascending orders;

(d) generating from the polynomials of the first order a scalar value $E_1$ representing a spatial intensity variation across the sampling window position;

(e) detecting whether said scalar value exceeds a preset threshold, and providing a control signal to a transmission control means;

(i) when said scalar value exceeds said threshold, thereby transmitting substantially equivalently all orders of said set of weighted polynomials; and (ii) when said scalar value does not exceed said threshold, thereby transmitting predominantly the zeroth order of said set of polynomials; and (f) receiving the transmitted orders of said set of weighted polynomials, performing thereon the inverse of said forward transform to derive a set of noise-reduced multiplied pixel values, and dividing the noise-reduced multiplied pixel values by said sampling window function so as to derive a set of pixel values which represent a noise-reduced portion of said video image within the sampling window position.

2. A method as claimed in claim 1, wherein said sampling window function is a Gaussian or a binomial function, and said set of weighted polynomials are Hermite polynomials, or Krawtchouk polynomials, respectively.

3. A method as claimed in claim 1, wherein between steps (e) and (f) said method further comprises the steps of: aggregating a predetermined number of adjacent sampling window positions, as represented by their zeroth order polynomials, so as to form a larger sampling window; and performing steps (a) to (f) with respect to said larger sampling window.

4. A method as claimed in claim 3, wherein said sampling window function is a Gaussian or a binomial function, and said set of weighted polynomials are Hermite polynomials, or Krawtchouk polynomials, respectively.

5. A method as claimed in claim 3, wherein between steps (e) and (f) said method further comprises the steps of: aggregating a predetermined number of adjacent sampling window positions, as represented by their zeroth order polynomials, so as to form a still larger sampling window, and performing steps (a) to (f) with respect to said still larger sampling window.

6. A method as claimed in claim 5, wherein said sampling window function is a Gaussian or a binomial function, and said set of weighted polynomials are Hermite polynomials, or Krawtchouk polynomials, respectively.

7. Apparatus for reducing noise in a two-dimensional video image formed by pixels of various pixel intensities, comprising:

windowing means for sampling the image with a uniform sampling window successively placed at each of a uniform array of sampling window positions, each pixel being included in one or more of the sampling window positions, the sampling deriving from each pixel a pixel value in each of the sampling window positions in which said pixel is included;

multiplying means coupled to said windowing means for multiplying the pixel values in each sampling window position by a sampling window function so as to derive a set of multiplied pixel values for each sampling window position;

forward transform means coupled to said multiplying means for performing a forward transform of the set of multiplied pixel values for each sampling window position, so as to derive for each sampling window position a finite set of weighted polynomials which are orthogonal to said sampling window function and include a zeroth order polynomial and polynomials of a first and further ascending orders, the respective orders of said set of weighted polynomials being produced at respective outputs of said forward transform means;

intensity determining means coupled to a first order output of said forward transform means for generating from the first orders of said set of weighted polynomials for each sampling window position a scalar value ($E_1$) representing a spatial intensity variation across the relevant sampling window position;

transmission control means coupled to the outputs of said forward transform means and to said intensity determining means and which, for each sampling window position, is adapted to detect whether said scalar value exceeds a preset threshold and to control transmission of the set of weighted polynomials at the outputs of said forward transform means so that (i) when said scalar value exceeds said threshold, all orders of said set of weighted polynomials are transmitted substantially equivalently, and (ii) when said scalar value does not exceed said threshold, predominantly the zeroth order of said set of polynomials are transmitted; and inverse transform means for receiving the set of weighted polynomials passed by said transmission control means for each sampling window position and performing thereon the inverse of said forward transform so as to derive a set of noise-reduced multiplied pixel values, and dividing the noise-reduced multiplied pixel values by said sampling window function so as to derive a set of noise-reduced pixel values representing a noise-reduced portion of said video image within the sampling window position.

8. An apparatus for reducing noise in a video image constituted by a two-dimensional array of pixels, said apparatus having successive levels each of which is an apparatus as claimed in claim 7, said levels being interconnected in pyramid relationship such that:

the zeroth order output of said forward transform means in each successive level of said pyramid except the last level thereof is coupled to an input of the windowing means in the next higher level of said pyramid;

an output of said inverse transform means in each successive level of said pyramid except the lowest level thereof is coupled to a zeroth order input of the inverse transform means in the next lower level to supply thereto pixel values in lieu of the lowest order of the set of polynomials produced by the forward transform means in said next lower level; and the sampling window employed in each successive level of said pyramid after the lowest level thereof is formed by a plurality of adjacent sampling windows employed in the immediately preceding level.

* * * * *